United States Patent [19]

Shimizu et al.

[11] Patent Number: 5,315,347
[45] Date of Patent: May 24, 1994

[54] DIFFUSION TRANSFER TYPE DUPLICATING CAMERA

[75] Inventors: Hiroshi Shimizu; Jirou Ikeo; Katsutoshi Kabeta; Yoshito Miyazaki, all of Gunma, Japan

[73] Assignees: Fuji Photo Film Co., Ltd., Kanagawa; Ushio Denki Kabushiki Kaisha, Tokyo, both of Japan

[21] Appl. No.: 52,666

[22] Filed: Apr. 27, 1993

[30] Foreign Application Priority Data

| Apr. 27, 1992 | [JP] | Japan | 34343[U] |
| Apr. 27, 1992 | [JP] | Japan | 34344[U] |
| Apr. 27, 1992 | [JP] | Japan | 34345[U] |

[51] Int. Cl.$^5$ .................. G03B 27/52; G03B 27/70; G03B 27/32
[52] U.S. Cl. .................. 355/043; 355/27; 355/28; 355/50
[58] Field of Search .......... 355/43, 27, 28, 29, 355/100, 50

[56] References Cited

U.S. PATENT DOCUMENTS

| 4,835,574 | 5/1989 | Ohi | 355/27 |
| 4,843,435 | 6/1989 | Horiguchi et al. | 355/100 |
| 4,962,314 | 10/1990 | Hirota et al. | 250/318 |
| 5,099,274 | 3/1992 | Mirlieb et al. | 355/27 |
| 5,146,264 | 9/1992 | Shirai et al. | 355/27 |
| 5,164,763 | 11/1992 | Masanori et al. | 355/27 |
| 5,208,612 | 5/1993 | Obu et al. | 346/153.1 |
| 5,210,581 | 5/1993 | Kuzuya | 355/290 |
| 5,227,826 | 7/1993 | Sander | 354/301 |

FOREIGN PATENT DOCUMENTS 62-6735 1/1987 Japan .
64-7648 2/1989 Japan .
1-112242 4/1989 Japan .

OTHER PUBLICATIONS

English language abstract for Japanese Unexamined Patent Publication No. 1-112242.

Primary Examiner—Richard A. Wintercorn
Attorney, Agent, or Firm—Sughrue, Mion, Zinn, Macpeak & Seas

[57] ABSTRACT

A duplicating camera, especially, a diffusion transfer type duplicating camera including an exposure box in which a scanner for scanning across the surface of an original in the form of a slit is incorporated and a transfer box in which a sheet of photosensitive material is exposed to light so that a set of slit images from the exposure box can be formed on the photosensitive material, and in which the image recorded on the photosensitive material is transferred to an image receiving material. These exposure and transfer boxes are arranged in an adjustable manner so that the scan axis of the scanning unit can be aligned with the transfer axis of the photosensitive material. In the exposure stage, an exposure table on which the photosensitive material is transferred is positioned above conveyor rollers disposed on both sides of the exposure table, so that a nominal rise occurs in the photosensitive material traveling above the exposure table.

13 Claims, 11 Drawing Sheets

F I G. 15
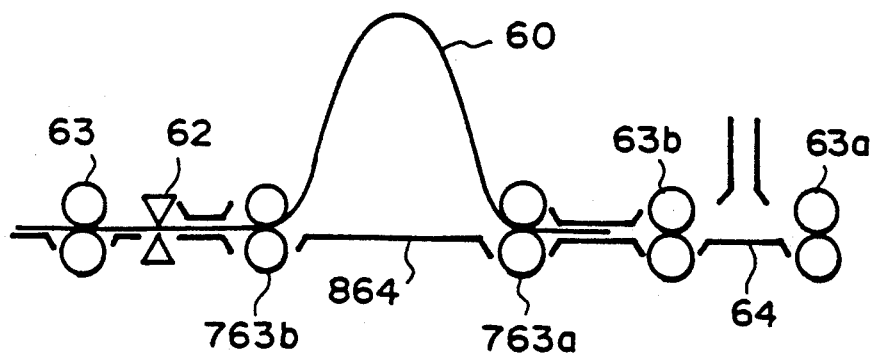
F I G. 16
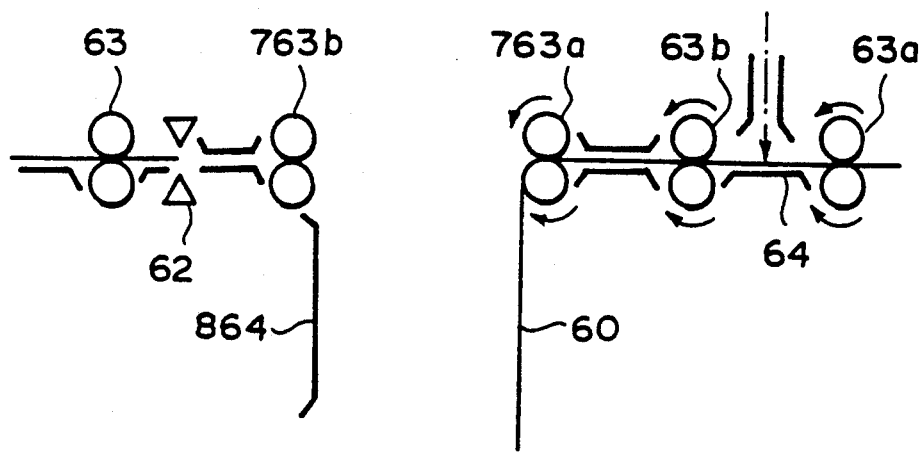

DIFFUSION TRANSFER TYPE DUPLICATING CAMERA

BACKGROUND OF THE INVENTION

1. Field of the Invention

This invention relates to a diffusion transfer type duplicating camera used for the preparation of a block copy.

2. Description of the Prior Art

In this diffusion transfer type duplicating camera, a photosensitive material, called a negative paper, is exposed to light to obtain a latent image of an original on the photosensitive material. This exposed photosensitive material is then superimposed on an image receiving material, called a positive paper, and these materials are then immersed in a developer, so that the image recorded on the photosensitive material is diffused and transferred to the image receiving material. To obtain a latent image on the photosensitive material, it is necessary for a type of a duplicating camera, which takes an image of an original, to be capable of correctly acquiring images from a large A3 size original, or thereabouts, without distortions. Examples of such diffusion transfer type duplicating cameras are disclosed in Japanese Unexamined Utility Model Publication No. 62(1987)-6735, Japanese unexamined Patent Publication No. 1(1989)-112242, and Japanese Patent Publication No. 64(1989)-7648. These duplicating cameras also have drawbacks in that they become significantly bulky and heavy because of their reducing and magnifying functions.

For these reasons, when the duplicating camera is arranged such that the surface of the original, situated on a transparent glass original table, is scanned from the below thereof by means of a scanning unit including a light source which scans in the pattern of a slit, and that the light reflected from the original is radiated through a lens onto a sheet-like photosensitive material to be carried, the duplicating camera can have a simpler structure, and be made smaller so it becomes possible to carry out duplication like copying. By virtue of its reducing and magnifying functions, it is possible to change the ratio of the optical path length between the original and the lens to the optical path length between the lens and the photosensitive material, and also possible to adjust the ratio of the scan speed of the scanning unit to the feeding speed of the photosensitive material.

This duplicating camera is usually made up of an exposure box incorporating a scanning unit and a transfer box in which a photosensitive material sheet is exposed in the manner of a scanning to a slit-like light image from the exposure box. The exposed photosensitive material is superimposed on an image receiving material, then the image recorded on the photosensitive material is transferred to the image receiving material. The exposure box is put on the transfer box, and these boxes are located in position and secured by means of pins.

In the case of this duplicating camera, it is necessary to completely match the scan axis of the scanning unit with the axis along which the photosensitive material is conveyed in order to precisely transfer the image of the original to the image receiving material. If the scan direction of the scanning unit is at an angle to the direction in which the photosensitive material is conveyed, the resultant transferred image will be distorted into a parallelogram-like shape. Therefore, the exposure box and the transfer box are accurately positioned and fixed together.

Although these boxes are positioned by means of the pins as mentioned above, merely inserting the pins provided on the transfer box into the counterpart pin holes on the exposure box may cause the scan direction of the scanning unit in the exposure box to be at an angle to the transfer direction of the photosensitive material in the transfer box because of unevenness in position of the pins and pin holes.

In this type of duplicating camera, an exposure stage is composed of an exposure table on which the photosensitive material is slidably conveyed and conveyor rollers disposed upstream and downstream of the exposure table, and slit-like images of the original are exposed to the photosensitive material on the exposure table. To obtain a precise and high resolution duplicated image without distorted rulings, the photosensitive material must be transferred while it remains close contact with the upper surface of the exposure table, and the photosensitive material must remain flat. For these reasons, for example, a suction apparatus is hitherto provided on the exposure table so that the photosensitive material can be sucked downwards so as to remain closely in contact with the exposure table during its transfer. This results in a camera having a complicated structure and being heavier.

SUMMARY OF THE INVENTION

In view of the foregoing observations and descriptions, a first object of this invention is to provide a duplicating camera having a simple structure which is capable of completely matching the scan axis of a scanning unit with the conveyance axis of a photosensitive material, and which can obtain a precise transferred image.

A second object of this invention is to provide a duplicating camera having a simple structure wherein a photosensitive material is slidably conveyed while it is kept in contact with the top surface of an exposure table, and which can produce a precise high resolution duplicate image free of distorted rulings.

A third object of this invention is to provide a duplicating camera wherein a photosensitive material is guided over the top surface of an exposure table maintaining close contact with the top surface during the conveyance of the material, and which can produce high resolution and precise duplicated images.

A fourth object of this invention is to provide a duplicating camera having a plane mirror support structure which facilitates the mounting of a spring to a metal pressure fitting, and which can surely hold the plane mirror.

A fifth object of this invention is to provide a duplicating camera having a simple structure capable of preventing the rise in temperature of an original table.

A sixth object of this invention is to provide a duplicating camera having a simple structure capable of hindering the actuation of the camera system when the loading of a new magazine is overlooked.

A seventh object of this invention is to provide a duplicating camera capable of easily adjusting pressures of pressure rollers exerted on a roller to an optimum value.

An eighth object of this invention is to provide a diffusion transfer type duplicating camera which can adjust exposure in a simple manner in response to either a positive a negative used as the photosensitivity material, and which prevents the extension of processing periods.

A ninth object of this invention is to provide a diffusion transfer type duplicating camera, wherein it is possible to reduce the distance between the cutter and the exposure position, so that the camera has a narrower width, which, in turn, leads to a compact duplicating camera.

A tenth object of this invention is to provide a diffusion transfer type duplicating camera, wherein it is possible to reduce an interval between a cutter and the exposure location, and which can attain accurate duplication without vibrations to the photosensitive material.

An eleventh object of this invention is to provide a diffusion transfer type duplicating camera having a simpler structure which prevents a guide member from clogging with a photosensitive material.

To these ends, according to one aspect of this invention, there is provided the exposure box is rotatably disposed on the transfer box, and the exposure box and the transfer box are fixed to each other after the scan axis of the scanning unit is matched with the transfer axis of the photosensitive material.

According to another aspect of this invention, there is provided a diffusion transfer type duplicating camera including an exposure box, which incorporates a scanning unit causing light to be swept in the pattern of a slit over an original situated on an original exposure table, and a transfer box, in which a sheet of photosensitive material which is conveyed parallel with respect to the original exposure table at an exposure stage is exposed to light representing a slit image of the original, and the exposed photosensitive material is superimposed on an image receiving material, so that the images recorded on the photosensitive material are transferred to the image receiving material, wherein the duplicating camera is characterized in that the exposure stage is composed of an exposure table over the upper surface of which the photosensitive material is slidably transferred and conveyor rollers disposed upstream and downstream of the exposure table, the upper surface of the exposure table being situated above the level of the photosensitive material conveyed by the conveyor rollers.

In one preferred mode of this invention, the exposure table comprises the exposure table further comprises a slit plate situated in close proximity to the exposure table, and a light shield member including two parallel plates erected on the slit plate, wherein the both ends of the slit extend to the vicinity of the conveyance rollers.

Since the exposure box is rotatably disposed on the transfer box, it is possible to match the scan axis of the scanning unit with the transfer axis of the photosensitive material by adjusting the angle of the exposure box, and hence an accurate duplicate image can be obtained because the transfer box and the exposure box are fixed together after the matching of the axes of the boxes.

Since the photosensitive material is tensionally stretched between the conveyor rollers disposed upstream and downstream of the exposure table, this material tries to travel along the virtual line between the conveyance level of the rollers. However, because the top surface of the exposure table is positioned above the virtual line, the photosensitive material travels maintaining close contact with the nominally raised upper surface of the exposure table, thereby preventing the photosensitive material from being lifted up from the exposure table. Accordingly, it is possible to obtain precise high resolution duplicate images free of distorted rulings.

According to another aspect of this invention, there is provided a diffusion transfer type duplicating camera including an exposure box, which incorporates a scanning unit causing light to be swept in the pattern of a slit over an original situated on an original exposure table, and a transfer box, in which a sheet of photosensitive material which is conveyed parallel with respect to the original exposure table at an exposure stage is exposed to light representing a slit image of the original, and the exposed photosensitive material is superimposed on an image receiving material, and the images recorded on the photosensitive material are transferred to the image receiving material, wherein the duplicating camera is characterized in that the exposure box is rotatably disposed on the transfer box, and the exposure box and the transfer box are fixed to each other after the scan axis of the scanning unit is matched with the transfer axis of the photosensitive material; and the exposure stage is composed of an exposure table, in which the photosensitive material is slidably transferred over the upper surface of the exposure table, conveyor rollers disposed upstream and downstream of the exposure table, a slit plate situated in close proximity to the exposure table, and a light shielding member including two parallel plates erected on the slit plate, wherein the both ends of the slit extend to the vicinity of the conveyance rollers.

Since the light shield member is integrally provided on the slit plate, it is possible to cut off stray light in the duplicating camera system and light which has undergone multiple reflections within the light shielding member can therefore be discounted. The slit plate is situated in proximity to the exposure table, and the both ends of the slit plate extend to the vicinity of the conveyor rollers, and hence the slit plate acts as a guide for the photosensitive material, whereby the photosensitive material remains in contact with the upper surface of the exposure table during its transfer dispensing with a suction device. Therefore, it is possible to obtain a precise high resolution duplicate.

According to one preferred mode of this invention, the scanning unit includes a plane mirror holding structure wherein a rectangular plane mirror at both ends thereof being pressed against receiving protuberances is secured by means of a spring supported by a metal pressure fitting. The spring should be constituted of a substantially bow-shaped pressing portion and an inverted U-shaped holding portion, and notches should be formed on the top surface of the metal pressure fitting. The holding portion of the spring is inserted into the notch by compressing the holding portion so that the pressing portion of the spring can press against the plane mirror.

Since the spring is interposed between the metal pressure fitting and the plane mirror, the mounting of the plane mirror can be assured. This spring is composed of the pressing portion and the inverted U-shaped portion, and the spring is inserted and held in the metal pressure fitting while the holding portion presses against the notch, whereby the spring can be mounted on the metal pressure fitting in a simple manner. Thus, the mirror holding structure according to this invention needs no machine screws, whereby the mounting operations of the mirror significantly simplified.

According to one preferred mode of this invention, the stand-by position of the scanning unit should preferably be positioned below the position which is adjacent to the exposure table. If necessary, a metal heat sink should be disposed at the stand-by position of the upper surface of the camera body. This arrangement prevents the original exposure table from receiving heat from the source lamp, and most of the heat is emitted once radiated to the heat sinking plate. Thus, it becomes possible to prevent a temperature rise of the original exposure table.

According to one preferred mode of this invention, there should preferably be provided a photo sensor for detecting whether or not a magazine storing the photosensitive material is loaded, the sensor being arranged so that the duplicating camera becomes active only when the sensor detects the loading of the magazine. This prevents a wasteful actuation of the duplicating machine by pressing an operating switch when the loaded of a new magazine is overlooked.

According to one preferred mode of this invention, a conveyor system for carrying the photosensitive material should preferably be constituted of a rod-shaped roller extending along the transverse direction of the photosensitive material, and a plurality of guide rollers, each being rotatably supported by a nip possessing spring characteristics so that the guide roller can be held against the roller, wherein the nips are mounted on a rotating shaft parallel to the roller, and at least one end of the rotating shaft is provided with an adjustment screw which regulates the pressures of the guide rollers exerted on the roller in response to the rotation of the shaft. The adjustment of the rotating shaft by means of the adjustment screw allows the pressure of the guide rollers exerted on the roller to be regulated simultaneously, so that the pressure regulation range becomes wide, and it is possible to facilitate the optimum pressure adjustment.

According to one preferred mode of this invention, there should preferably be provided a selection mode for varying the amount of light emitted from the source lamp depending on whether the photosensitive material to be used is a positive or a negative sheet. Even when the sensitivity of the photosensitive material differs with regard to whether the material is a positive sheet or a negative sheet, the amount of light emitted from the source lamp can be changed without varying the exposure period, and hence it is possible to maintain a constant scan speed for the scanning unit and a constant feed rate for the photosensitive material. Eventually, it becomes very easy to regulate the exposure in a simple manner without the extension of processing periods.

According to one preferred mode of this invention, there should be provided a group of conveyor rollers for carrying the photosensitive material, wherein there is provided a controller means for individually controlling two rollers of the conveyor rollers which are adjacent to each other and situated upstream of the exposure position. This controller should be arranged in such a manner that only the upper rollers are revolved when the photosensitive material is caught in the two conveyor rollers so that a substantially U-shaped sag can be created in the photosensitive material between the two rollers, and then the photosensitive material can be cut to a desired length. The creation of the Unshaped sag in the photosensitive material results in a reduction of the distance between the cutter and the exposure position, thereby providing a compact duplicating camera having a narrower width. In this case, the sag becomes more stable by displacing a guide member between the two rollers so that the photosensitive member bulges downwardly in a U shape.

In more preferred mode, the group of conveyor rollers should be composed of a controller means for individually controlling two rollers of the rollers which are adjacent to each other and are situated upstream of the exposure location, and displacing means for displacing a guide member between the two rollers, wherein when the photosensitive material is caught in the two rollers, the guide member between the rollers is displaced, and only the upper rollers are revolved so that a substantially U-shaped sag can be created between the two rollers and wherein the photosensitive material is then cut to a desired length after the upper rollers are stopped, and only the upper roller of the two is rotated so that the photosensitive material thus separated can hang down from the other roller of the two. Since the photosensitive material hangs down from the conveyor roller by rotating only the upper roller of the two after the separation of the photosensitive material, it is possible to prevent vibrations resulting from the separation from being transmitted to the photosensitive material which undergoes the exposure. Therefore, it is possible to obtain on the photosensitive material a latent image free of distortions, which results in an accurate copy.

According to one preferred mode of this invention, there should preferably be provided a guide member, defined by the upper and lower plates, for directing the exposed photosensitive material, wherein the guide member is composed of a horizontally extending portion for directing the photosensitive material to the exposure stage, a tilted portion obliquely extending downwards for leading the exposed photosensitive material so that the material can be superimposed on the image receiving material, and a bulging portion having a wider clearance between the upper and lower plates thereof for the swell of the photosensitive material. In addition, a feed rate regulation roller having a faster circumferential speed and another feed rate regulation roller should preferably be provided respectively in front of the bulging portion and the tilted portion, locating downstream of the faster feed rate regulation roller, thereby preventing the guide member from becoming clogged with photosensitive material.

BRIEF DESCRIPTION OF THE DRAWINGS

FIG. 15 is a diagrammatic representation illustrating the transfer processes of a photosensitive material according to another embodiment of this invention;

FIG. 16 is a diagrammatic representation illustrating the transfer processes of a photosensitive material according to still another embodiment of this invention.

DETAILED DESCRIPTION OF THE PREFERRED EMBODIMENTS

Figure 1:
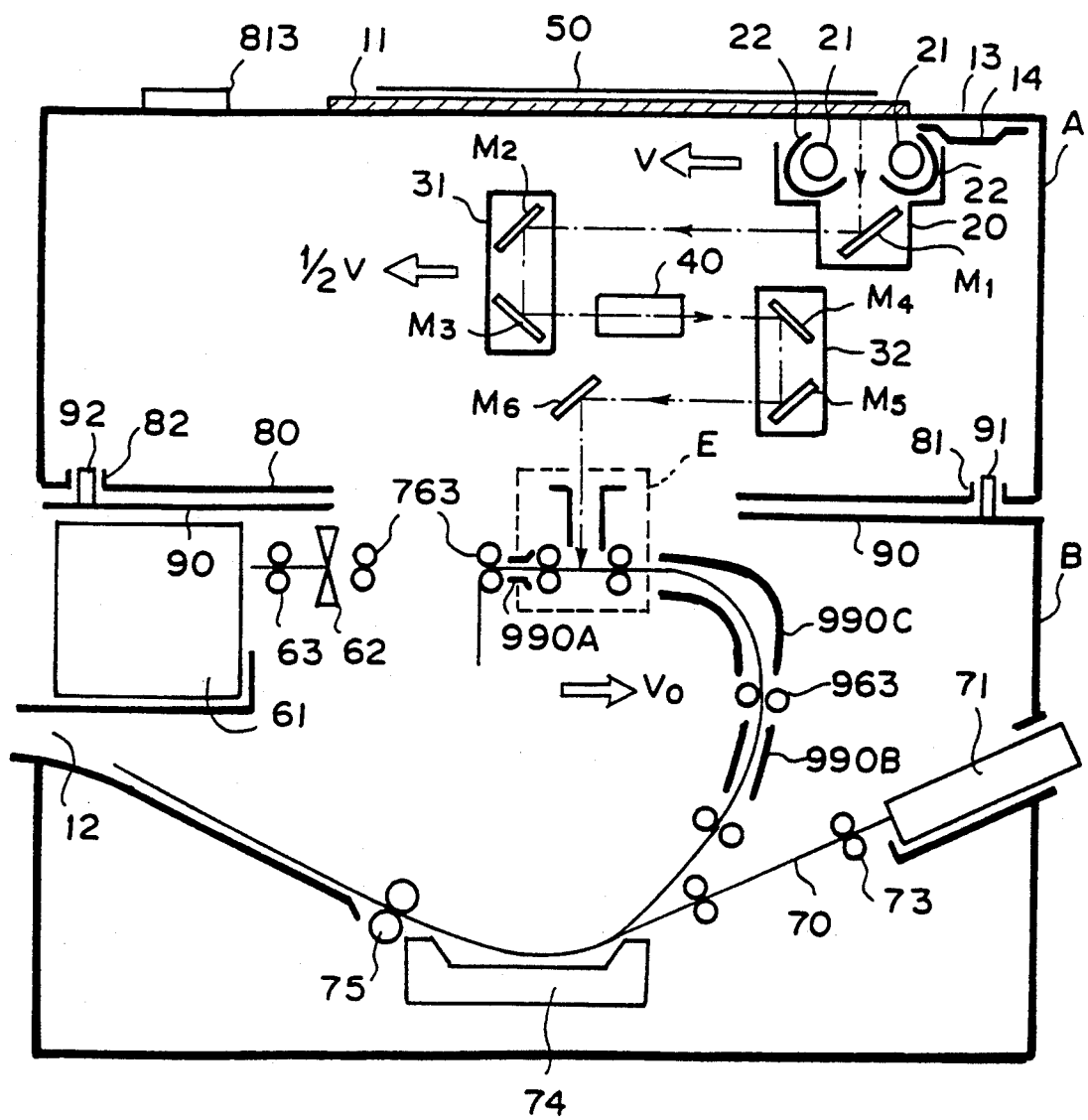
FIG. 1 is a schematic representation of a diffusion transfer type duplicating camera according to one preferred embodiment of this invention.

FIG. 1 diagrammatically represents a diffusion transfer type duplicating camera being composed of an exposure box A and a transfer box B. In FIG. 1, a transparent glassmade original exposure table 11 is provided on the top of the exposure box A, wherein an original 50, for instance, A3 size can be placed on the exposure table. A scanning unit 20 which travels at a variable speed V is movably situated below the original exposure table 11. This scanning unit 20 is of double-lamp type, namely, provided with two tubular-shaped source lamps 21, each being surrounded with a gutter mirror 22. The scanning unit scans across the original 50 in the pattern of a slit, and a plane mirror M1 is positioned at the bottom of the scanning unit. With this arrangement, the traverse of the scanning unit 20 provides a scan across the entire surface of the original 50, and light reflected from the original 50 is reflected horizontally from the mirror M1. The source lamp 21 has a rated voltage of 100 V and a rated power of 330 W.

A first mirror unit 31 and a second mirror unit 32 are provided with a pair of plane mirrors M2 and M3 and a pair of plane mirrors M4 and M5, respectively, wherein the mirrors of each pair are mounted at an angle of 45 degrees in a pattern of a roof, and a horizontal lens 40 is interposed between the pairs of the mirrors while its optic axis is in alignment with that of the mirrors. Thus, the reflected light of the original 50 is reflected from the mirror M1, then enters the lens 40 through reflections from the mirrors M2 and M3, and the light appeared from the mirrors M2 and M3 is further reflected from the mirrors M4, M5 and M6, and exits from the exposure box A.

At an exposure stage E, the image of the original 50 is produced in the form of a slit on a photosensitive material 60 which horizontally travels at a speed of V0. In order to obtain a high resolution and accurate duplicated image, it is material that horizontal level of the photosensitive material 60 remains unchanged during its advancement. The structure of the exposure stage E which prevents variations in horizontal level of the photosensitive material 60 will be described later.

The first mirror unit 31 advances at a speed of ½ V, that is, half a speed of the scanning unit 20 in the same direction of the travel of the scanning unit, so that the optical path length between the original 50 and the lens 40 remains unchanged even when the first mirror unit advances according with the travel of the scanning unit 20. The initial positions (the start of the advancement) of the first mirror unit 31 and the second mirror unit 32 can be changed, whereby it is possible to set a reducing or magnifying factor by changing the optical path length between the original 50 and the lens 40 and the optical path length between the lens 40 and the photosensitive material 60. The reducing or magnifying factor in the direction at right angle to the travel of the scanning unit 20 can be set by changing the optical path length from the original 50 to the photosensitive material 60 via the lens 40, whilst, in order to obtain a reducing or magnifying factor along the scanwise direction of the scanning unit 20, it is necessary to adjust the ratio of the scan speed V of the original 50 to the transfer speed V0 of the photosensitive material 60 in addition to the change of the optical path length. For this purpose, the scan speed V is varied in response to the reducing or magnifying factor, so that a reducing or magnifying factor in the direction at right angle to the scanwise direction is equivalent to the reducing or magnifying factor along the scanwise direction.

The photosensitive material 60 horizontally travels at a speed V0 in the transfer box B. The photosensitive material 60 is composed of a paper or film support, the surface of which is coated with a photosensitive layer. When the photosensitive material is exposed to light representing slit images from the exposure box A, a latent image corresponding to the original 50 is produced on the photosensitive layer. This photosensitive material 60 stored in the form of a coil in a magazine 61 is horizontally fed by means of a conveyor roller 63, and is cut to a desired length by a cutter 62. As previously mentioned, slit images of the original 50 are sequentially produced on the photosensitive sheet material 60.

As with the photosensitive material, an image receiving material 70 is composed of a paper or film support, the surface of which is coated with an image receiving layer, and is fed from a magazine 71 by means of a conveyor roller 73. The exposed photosensitive material 60 is superimposed on the image receiving material 70, and these are pressed together by a squeezing roller 75 after they are immersed in a developer within a tray 74. The latent image on the photosensitive layer is developed in the developer, and turns to a blackened silver, whereas silver halide of the unexposed portion changes to a water-soluble silver salt, and is diffused into the image receiving material 70. In other words, the image of the original 50 is duplicated on the image receiving material 70, and the image receiving material 70 and the photosensitive material 60 are fed out from an outlet 12.

FIRST EMBODIMENT

Figure 2:
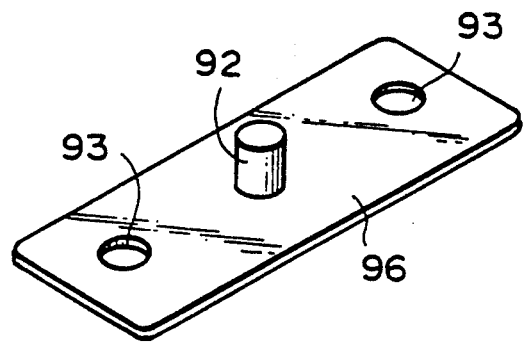
FIG. 2 is an illustration of an engaging plate.
Figure 3:
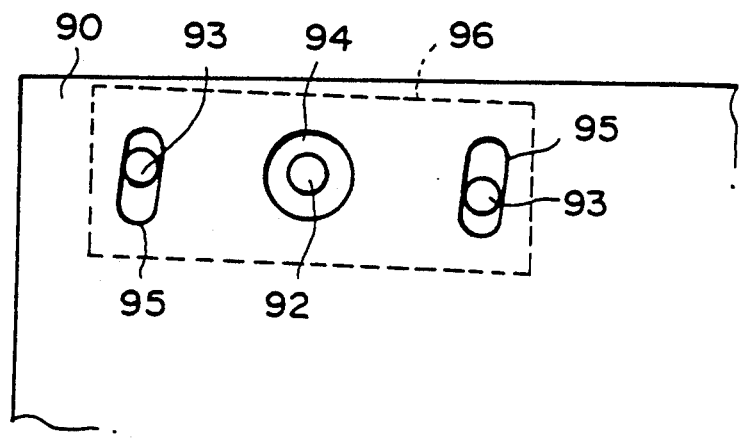
FIG. 3 is a plan view showing pins attached to the engaging plate shown in FIG. 2.
Figure 4:
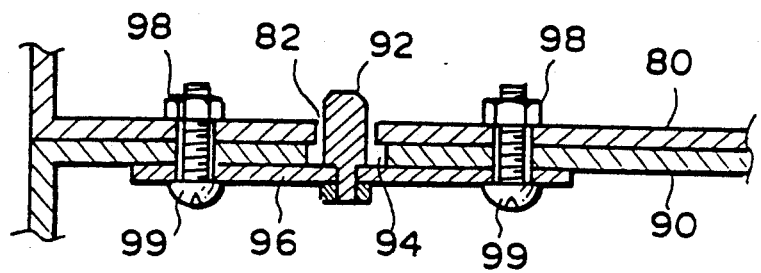
FIG. 4 is a cross-sectional view of the pins shown in FIG. 3.

Two pins 91 and 92 are erected at opposite ends of a diagonal line on the top surface 90 of the transfer box B, and these pines are received and positioned in corresponding pin holes 81 and 82 formed on the bottom surface 80 of the exposure box A. The pin 91 directly stands on the top surface 90, whilst, as shown in FIG. 2, the pin 92 is provided on an engaging plate 96 which is mounted on the rear surface of the top plate 90 as seen from FIG. 3. In more detail, mounting holes 93 and 93 are drilled on opposite ends of the engaging plate 96, and elongated mounting holes 95 and 95 are drilled on the top plate 90. A through hole 94 which is larger than the pin 91 is also drilled between the mounting holes 95 and 95, and the pin 92 stands upright while it is inserted into the through hole 94. The engaging plate 96, the top plate 90 and the bottom plate 80 are fixed together with bolts 99 and nuts 98. As seen from FIG. 4, since the mounting holes 95 and 95 have an elongated hole, and since the through hole 94, into which the pin 92 is inserted, is larger than the pin 92, it is possible to adjust the position of the pin 92. In short, the pin 91 is a fixed pin, and the pin 92 is a movable pin.

Figure 5:
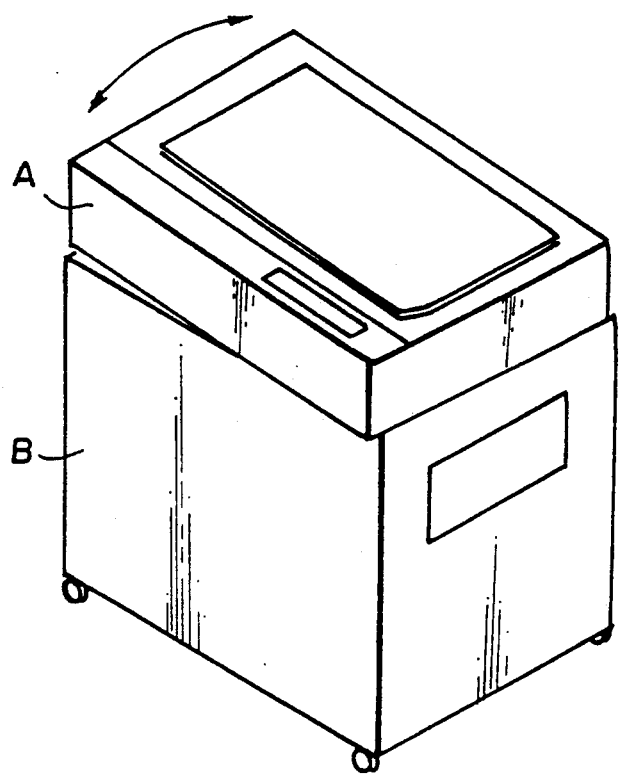
FIG. 5 is a diagrammatic representation illustrating the rotation of a duplicating camera according to a first embodiment of this invention.

While the bolts 99 are loosely fastened with the nuts 98, which, in turn, provides the positional adjustment of the pin 92, the pins 91 and 92 are inserted into the pin holes 81 and 82, respectively. With this result, the exposure box A becomes rotatable around the pin 91 relative to the transfer box B as shown in FIG. 5. In effect, the angular displacement of the exposure box A is at most within a range of +/−1 degree, and it should be understood that FIG. 5 makes an exaggeration of displacements for convenience's sake. A duplicated image of an original for inspection purposes is practically formed on the image receiving material 70. At this time, if the scan axis of the scanning unit 20 is incompletely matched with the transfer axis of the photosensitive material 60, and if there arises an angle between the advancement direction of the scanning unit 20 and the transfer direction of the photosensitive material 60, a resulting duplicate image will be distorted like a parallelogram. Checking the distortion of the duplicate, align the advancement direction of the scanning unit 20 and the transfer axis of the photosensitive material 60 by rotating the exposure box A. After this alignment, the pin 92 is completely fixed by the additional tight fastening of the bolts 99 with the nuts 98. Thus, it becomes possible to obtain an accurate duplicate image free of parallelogrammic distortions.

The structure of the exposure stage E will now be described with reference to FIG. 6. An exposure table 64 downwardly extending at opposite ends thereof is disposed by a clearance of 0.5 mm right below a slit 65 through which a slit image of the original 50 passes. A conveyor roller 63a, including a drive roller 631 which is actuated by a non-illustrated motor and a pressure roller 632, is positioned downstream of the exposure table 64. A conveyor roller 63b including a follower roller 633 which incorporates a one-way clutch and a pressure roller 634 are positioned upstream of the exposure table 64. The span between the conveyor roller 63a and the conveyor roller 63b is 34 mm. In addition, a guide rubber roller 636 is provided downstream of the conveyor roller 63a, and an auxiliary guide roller 635 which is smaller than the rubber roller 636 is provided upstream of the conveyor roller 63b.

The top surface of the exposure table 64 is positioned by 2 mm above a virtual line L connecting the transfer level of the conveyor roller 63a and the transfer level of the conveyor roller 63b, namely, connecting between the junction where the drive roller 631 meets the pressure roller 632 and the junction where the follower roller 633 meets the pressure roller 634. The rubber roller 636 and the auxiliary roller 635 are positioned below the virtual line L. Here, the exposure table 64 is not equipped with a suction device which is generally employed for a conventional exposure table.

With the above arrangement, the photosensitive material 60 is guided by means of the auxiliary roller 635, so that the material advances obliquely lower to the conveyor roller 63b. The photosensitive material is then gripped by the conveyor roller 63b, and then gripped by the conveyor roller 63a after it passes through the clearance between the exposure table 64 and the slit 65. Because of the conveyor roller 63a which is a drive roller and is accelerated faster than the follower roller 63 that includes the one-way clutch, the photosensitive material 60 is pulled by the conveyor roller 63a, and is subjected to a tension. This photosensitive material is downwardly carried through the guide of the guide rubber roller 636. During this time, since the top surface of the exposure table 64 is positioned above the virtual line L, the photosensitive material 60 slidably travels with a nominal rise maintaining close contact with the top surface of the exposure table 64, wherein the photosensitive material remains in contact with the exposure table 64 during its advancement. Since the guide rubber rollers 636 and the auxiliary roller 635 are positioned below the virtual line L, it is possible to prevent the uplift of the photosensitive film from the exposure stage 64 with a more certainty. Therefore, a slit image is accurately formed on the photosensitive material 60, and it is possible to obtain a high resolution duplicate image without distorted rulings.

As mentioned above, according to a first embodiment of this invention, it is possible to match the advancement axis of the scanning unit with the transfer axis of the photosensitive material by adjusting an angle of the exposure box in spite of dispersions of the positions of the pins and pin holes, the advancement direction of the scanning unit in the exposure box and the transfer direction of the photosensitive material in the transfer box. Since the exposure box and the transfer box are fixed together after the above alignment, the duplicate camera, according to this embodiment, can produce an accurate duplicate.

In the above structure, since the mixture of stray light into the slit image causes the resolution of the image to be impaired, a light shielding member, being consisted of two parallel plates, is mounted on the exposure table. Even though such a light shielding member is provided, a part of the light which passes through the light shielding plates travels while it is reflected from the internal surface of the shielding member. Thus, there still occurs the impairment of the resolution of the image. To overcome such a problem, a slit is integrally formed on the tip end of the shielding member so as to shut off the light which travels while it undergoes reflections from the internal surface of the light shielding member.

Meanwhile, in order to obtain a high resolution and accurate duplicate, it is necessary that the photosensitive material should slidably travel over the top surface of the exposure table maintaining close contact with the top surface, and that the horizontal level of the photosensitive material should remain unchanged. For these purposes, in a conventional duplicating camera, the exposure table is equipped with, for instance, a suction device so that the photosensitive material can be brought in close contact with the top surface of the exposure table by forcefully drawing downwards the photosensitive material, thereby preventing the uplift of the photosensitive material out of the top surface of the exposure table during its advancement even when there is a wide clearance between the exposure table and the light shielding member. The addition of the suction device, however, complicates the structure of the exposure table, and adds to the weight of the duplicating camera. Accordingly, there has been a demand for the duplicating camera free of the suction device.

Figure 6:
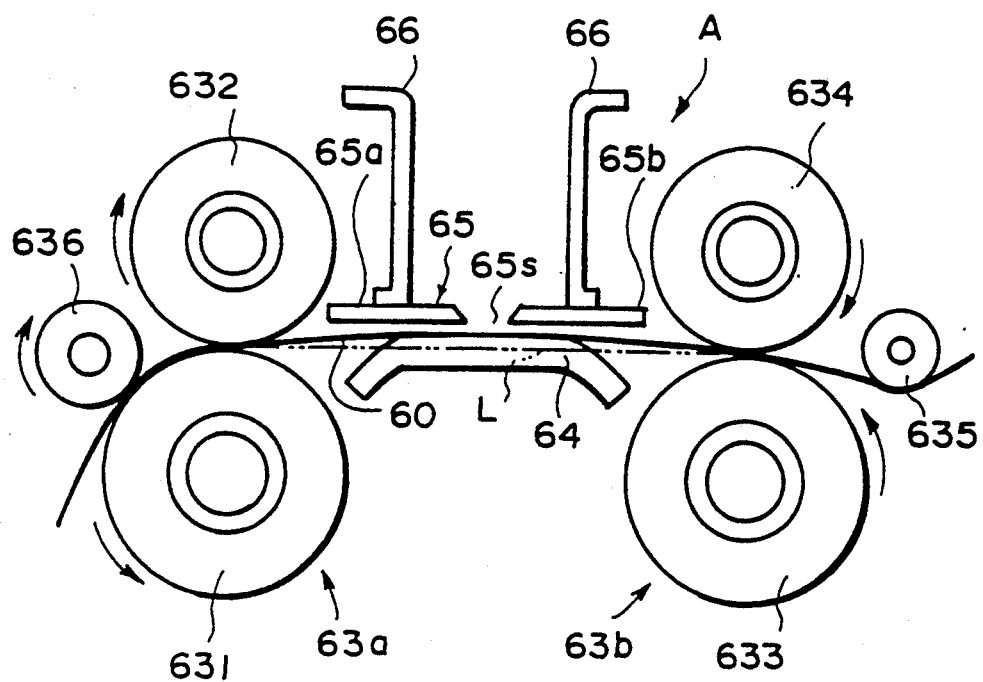
FIG. 6 is a schematic representation showing the structure of an exposure stage.

To this end, in another mode of this invention, as shown in FIG. 6, the exposure stage E is composed of the conveyor roller 63a, locating downstream of an exposure table 64 and being composed of a drive roller 631 driven by a non-illustrated motor and a pressure roller 632, and a conveyor roller 63b locating upstream of the exposure table 64 and including a guide rubber roller 636 and a guide auxiliary roller 635.

A slit plate 65 is horizontally situated above the exposure table 64, and a slit 65s is formed at the center of the slit plate 65. The wider the clearance of the slit 65s becomes, the more the amount of light increases, but the poorer the resolution of the image becomes. Therefore, a clearance of about 4 mm is considered appropriate. The edges of the slit 65s of the slit plate 65 should preferably be shaped into the edge of a knife. End portions 65a and 65b of the slit plate 65 extend closely to the conveyor roller 63a and the conveyor roller 63b, respectively. Thus, the slit plate 65 acts as a guide member for the photosensitive material 60. In order to ensure the transfer of the photosensitive material 60 along this guide member maintaining close contact with the exposure table 64, it is desirable to set the clearance between the exposure table 64 and the slit plate 65 to a value which extremely approximates to the thickness of the photosensitive material 60, for example, a value of 0.5 mm, or thereabouts. In addition, a light shielding member 66, including two parallel plates, is integrally formed on the slit plate 65 to shut off stray light in the duplicating camera system. The exposure table 64, according to this embodiment, is not equipped with a suction device which is employed in a conventional duplicating camera.

With the above arrangement, the photosensitive material 60 is guided by the auxiliary guide roller 635, so that the material advances obliquely lower to the conveyor roller 63b. The photosensitive material is gripped by the conveyor roller 63b, and then gripped by the conveyor roller 63a after it passes through the clearance between the exposure table 64 and the slit 65. The photosensitive material is then carried downwardly by means of the guide rubber roller 636. During this time, since the end portions 65a and 65b of the slit plate 65 extend to the vicinity of the conveyor rollers 63a and 63b, respectively, and since the clearance between the exposure table 64 and the slit plate 65 is significantly small, the photosensitive material 60 is led by the slit plate 65 with certainty to the exposure table 64, whereupon the material remains in contact with the exposure table 69 during its advancement. Accordingly, a slit image of the original 50 is accurately produced on the photosensitive material 60 without the use of the suction device, and hence it becomes possible to obtain a high resolution duplicate image.

SECOND EMBODIMENT

The scanning unit 20 is provided with rectangle plane mirrors M, and it is necessary to fixedly mount these plane mirrors M, because the scanning unit advances. However, since the plane glass mirror M has no resiliency at all, and possesses a small frictional resistance, when the edge of the plane mirror M which is held against a receiving table is directly pressed by means of the metal pressure fitting, the plane mirror M will not fit to a metal pressure fitting, as a result of which the metal pressure fitting may come loose.

To prevent this, the plane mirror M is pressed by the pressure metal together with a flexible member such as a rubber or a leaf spring sandwiched between the mirror and the metal pressure fitting. The flexible member is, however, liable to loose its pressure when it is used for a long period. In the meantime, the leaf spring must be attached to the metal pressure fitting, and hence the spring is fastened by machine screws. The use of the machine screws adds to the number of components, and the secure of the machine screw requires much time.

In a diffusion transfer type duplicating camera, according to this embodiment of this invention, a plane mirror holding structure includes a pair of receiving table 303 (only one receiving table is shown.) consisting of a thick plate and being mounted on a coupler 333. Strip-shaped two plane mirrors M are located face to face at an angle of 45 degrees, and opposite ends of the plane mirror M are held against hemispheric protuberances 331 formed on the receiving table 303. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

Figure 8:
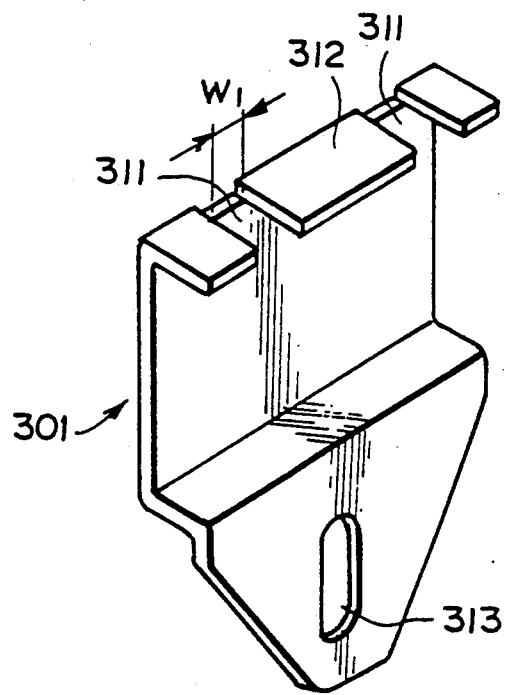
FIG. 8 is a perspective view showing the structure of a press fitting.
Figure 9:
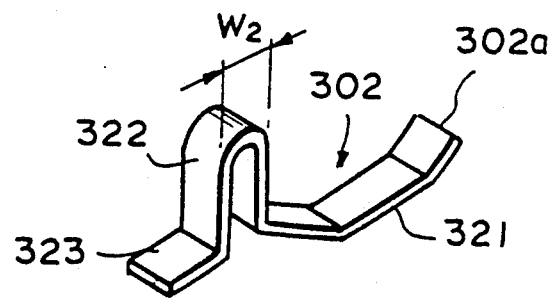
FIG. 9 is a perspective view showing the structure of a spring.

As shown in FIG. 8, the upper portion of a metal pressure fitting 301 is bent at right angle, so that it is formed into a top face 312, and two notches 311 and 311 are made on the top face 312. Each of these two notches 311 has a width W1 and the same figure. An elongated hole 313 for fastening the metal fitting to the receiver 303 is drilled at a lower position of the metal fitting 301.

The spring 302 is made up of a strip-shaped metal plate having a sufficient resiliency, and an inverted U-shaped holding portion 322 is formed integrally next to a flat portion 323. And a pressing portion 321, which has bends at a predetermined angle, and is substantially shaped into a bow, is formed integrally next to the holding portion 322. In a natural state, a width W2 of the holding portion 322 is nominally larger than the width W1 of the notch 311.

The holding portion 322 of the spring 302 is inserted into one of the notches of the metal pressure fitting 301 while the holding portion being compressed with fingers. Since the width W2 of the holding portion 322 is nominally larger than the width W1 of the notch 311, the holding portion 322 is pressed against the notch 311 under its spring force, so that the spring 302 remains fitted in the metal pressure fitting 301. Thus, it is possible to fit the spring 302 into the metal pressure fitting 301 in a simple manner without machine screws.

Figure 7:
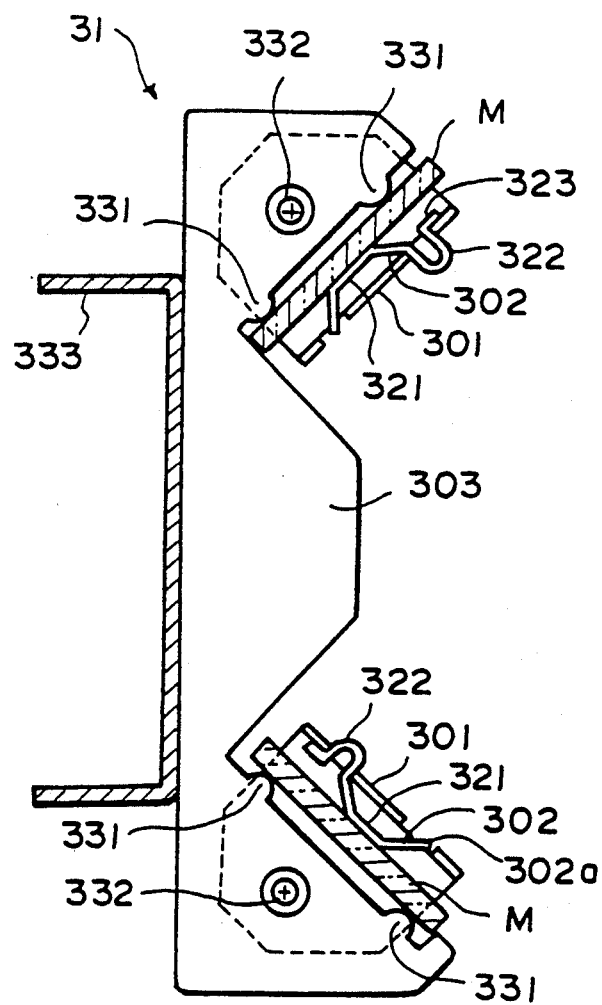
FIG. 7 is a fragmentary cross-sectional view of a plane mirror supporting structure.

As shown in FIG. 7, the metal pressure fitting 301 carrying the spring 302 is put on, and secured to, the receiving table 303 with a bolt 332 which is inserted in the elongated hole 313, and the mounting position of the metal pressure fitting 301 is adjusted by the utilization of the elongated hole 313 so that a pressing portion 321 of the spring 302 can force the plane mirror M. At this time, the boundaries between the flat portion 323, the holding portion 322 and the pressing portion 321 of the spring 302 bear against the inner-side surface of the top surface 312 of the press fitting metal 301, and receive the urging force of the spring. The tip end 302a of the spring 302 protrudes from the remaining notch 311 of the metal pressure fitting 301. Since the plane mirror M is pressed by the spring 302, the mirror will not come loose due to vibrations, and can be held with certainty.

As described above, in the plane mirror holding structure, according to this embodiment of this invention, the plane mirror is held by the spring sandwiched between the plane mirror and the metal pressure fitting, and the spring is composed of the substantially bow-shaped pressing portion and the inverted U-shaped portion. Since the holding portion is inserted into the notch formed on the metal pressure fitting while being compressed, the spring can be held in the metal pressure fitting in a simple manner, which, in turn, facilitates the mounting operation of the mirror.

THIRD EMBODIMENT

Since there are used as a source lamp of the scanning unit, for instance, two rod type incandescent lamps, each demanding a power of 300 W, the heat release value of the scanning unit is large. Accordingly, when the scanning unit returns to the stand-by position, heat still remains in the source lamp which went out. The stand-by position for the inactive scanning unit is situated below the end of the transparent glass original exposure table, there arises an uprise in temperature of the corresponding table end locating above the stand-by position, and it sometimes increases up to 50 C, or thereabouts. Because of this, the operator feels uncomfortably hot when come into touch with the heated table end, which makes the duplicating operations difficult to perform.

An exposure device used in a PPC copier has the structure similar to the scanning unit of the duplicating camera according to this invention. The exposure device of the PPC copier is faster than the scanning unit of the duplicating camera in a copying speed, and requires a much shorter waiting time. The source lamp providing a large amount of residual heat frequently returns to the stand-by position, and stands ready there. Accordingly, the transparent glass original exposure table is heated higher when compared with the scanning unit of the duplicating camera. Because of this, it becomes necessary to provide a forced cooling by means of a cooling fan. The forced-aircooling method not only adds to the cost, but also causes dusts in the air to enter the inside of the duplicating camera system. Accordingly, it is considered undesirable that the scanning unit of the duplicating camera which causes a less temperature rise as compared with the PPC copier is equipped with the cooling fan.

Figure 10:
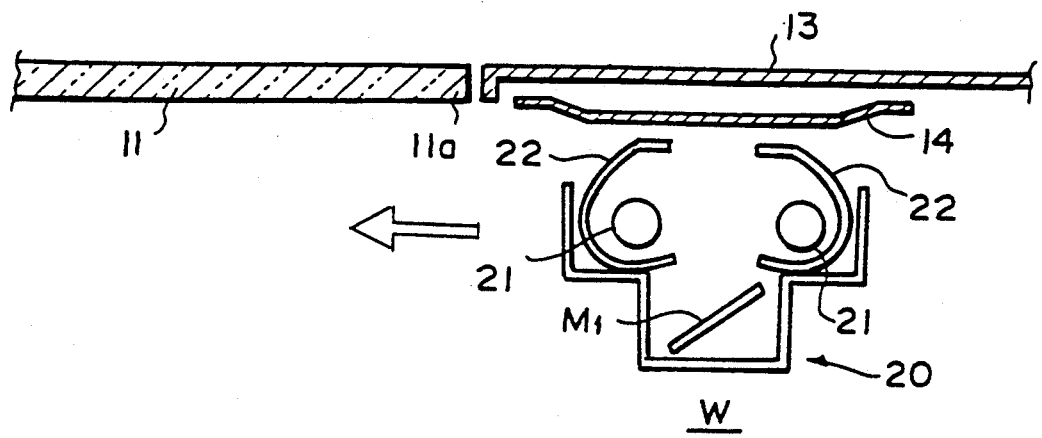
FIG. 10 is a diagrammatic representation illustrating a scanning unit and the stand-by position of the unit.

In a diffusion transfer type duplicating camera, according to this embodiment as shown in FIG. 10, an upper plate 13 is disposed in proximity to the end portion 11a of the transparent glass original exposure table 11, wherein a stand-by position W for the scanning unit 20 is situated below the position adjoining to the end portion 11a of the original exposure table 11: namely, the stand-by position locates below the upper plate 13, and is spaced from the right below of the transparent glass. If necessary, a heat sinking plate 14, which is made of a metal plate having a superior thermal conductivity such as an aluminum plate, is provided below the upper plate 13 in a confronting manner. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

When a non-illustrated switch is turned on while the original is situated on the original exposure table 11, the source lamps 21 light up, and the scanning unit 20 advances in the direction designated by the arrow. This unit then scans across the surface of the original in the pattern of a slit while a film is exposed to the light. Upon completion of the exposure, the source lamps 21 go out, and the scanning unit 20 travels in a reverse direction and returns to the stand-by position W. After the repetition of these operations, the source lamps 21 are in a heated state because of residual heat even though the lamps 22 are put out, and the heat is upwardly given off. Since the upper plate 13 situates above the stand-by position W for the scanning unit 20, the heat is not directly emitted to the original exposure table 11. Moreover, the addition of the heat sinking plate 14 causes the heat to be discharged after the heat has been radiated to the heat sinking plate. Thus, it is possible to prevent a temperature rise of the original exposure table 11, whereby the operator does not feel uncomfortable when come in touch with the original exposure table, and hence it becomes possible to readily perform the duplicating processes.

As mentioned above, in this embodiment, since the stand-by position for the scanning unit is defined at the position adjacent to the end portion of the transparent glass original exposure table, so that the stand-by position is spaced away from the transparent glass table, whereby it becomes possible to prevent a temperature rise of the original exposure table in a simple fashion without the use of the cooling fans.

FOURTH EMBODIMENT

The photosensitive material is stored in the form of a coil in a magazine, and this magazine is removably loaded in the body of the duplicating camera. When the photosensitive material runs out, a new magazine is loaded into the body of the duplicating camera. When the magazine is replaced with another, the exhausted magazine is taken out from the camera body, and the loading of a new magazine is overlooked. With the new magazine unloaded, the duplicating camera operates in the manner as mentioned above when the duplicating switch is turned on, but it results merely in the waste of image receiving materials without any duplications.

Figure 11:
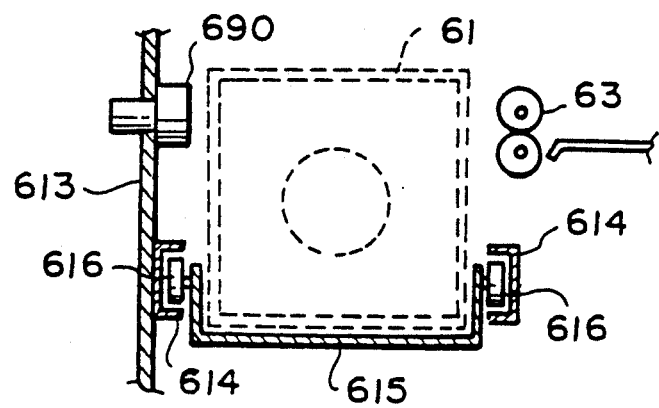
FIG. 11 is a schematic representation showing a sensor for detecting whether or not a magazine is loaded.

In a diffusion transfer type duplicating camera shown in FIG. 11, according to this embodiment of this invention, a magazine 61 is set to a predetermined location on a tray 615, and a photosensitive material being stored in the form of a coil in the magazine 61 is drawn from the magazine by means of a conveyor roller 63. On both sides of the tray 615 are provided rollers 616, and the tray advances along a pair of guide rails 614 which are arranged normal to a paper of the drawing. When the photosensitive material runs out, the magazine 61 can be replaced with a new one by drawing the tray 615 out of the body of the duplicating camera. An optical sensor 690 which is a reflection type photointerrupter is mounted on a chassis 613. When the magazine 61 is loaded at a predetermined location, light emitted from the optical sensor 690 is reflected from the magazine 61, whereupon the loading of the magazine 61 is detected, and hence the duplicating camera becomes active when the non-illustrated duplicating switch is turned on. If the loading of the magazine 61 is overlooked, light emitted from the optical sensor 690 will not be reflected, whereupon the unloading of the magazine 61 is detected, and hence the duplicating camera remains inoperative even when the duplicating switch is turned on. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

Thus, when the new magazine 61 is loaded into the duplicating camera, and when the duplicating switch is turned on while the original is situated on the original exposure table 11, the optical sensor 690 senses that the magazine 61 is loaded, and the duplicating camera is actuated, so that the duplication is effected. Even if the magazine 61 is unloaded, the duplicating camera remains inoperative, whereby it becomes possible to prevent the wasteful actuation of the duplicating machine without any duplications.

As mentioned above, the duplicating camera, according to this embodiment, is provided with an optical sensor for detecting whether or not the magazine is loaded, and the duplicating camera becomes operative only when the optical sensor detects that the magazine is loaded, whereby it becomes possible to prevent the wasteful actuation of the duplicating camera without duplications when the magazine is unloaded.

FIFTH EMBODIMENT

Figure 12:
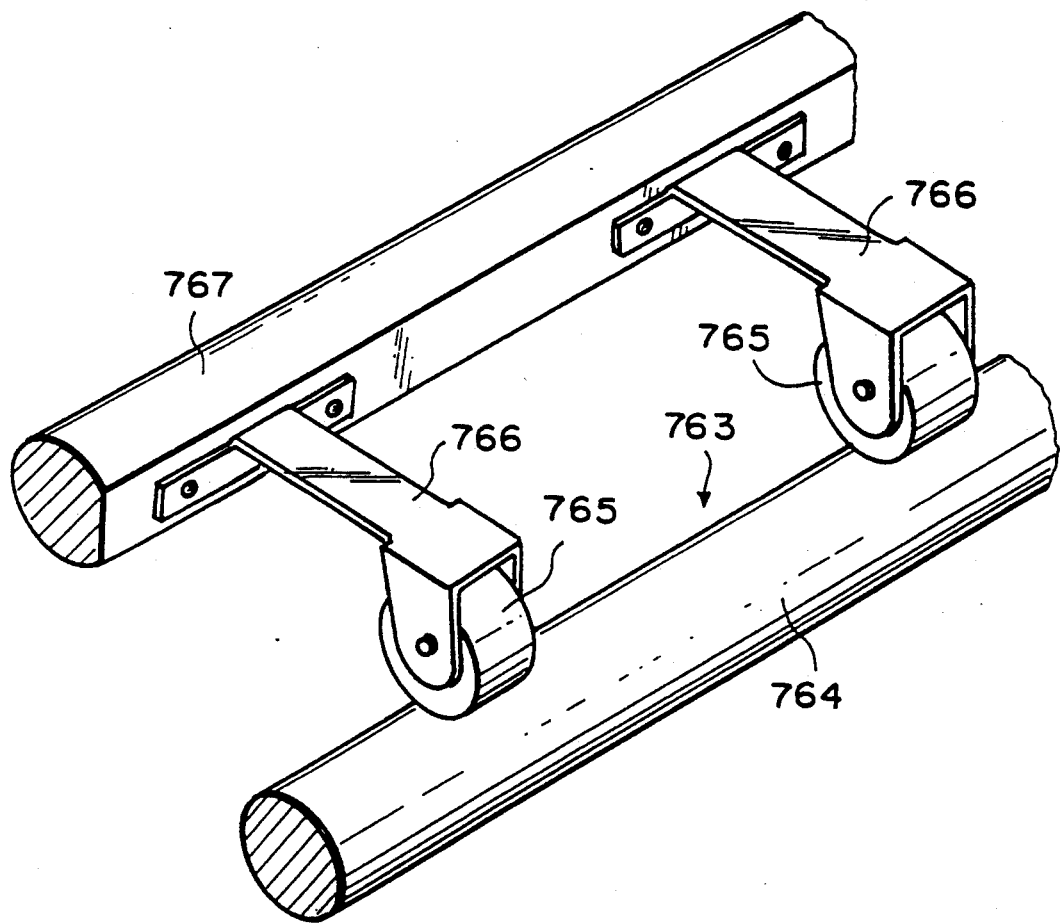
FIG. 12 is a perspective view showing a conveyor.
Figure 13:
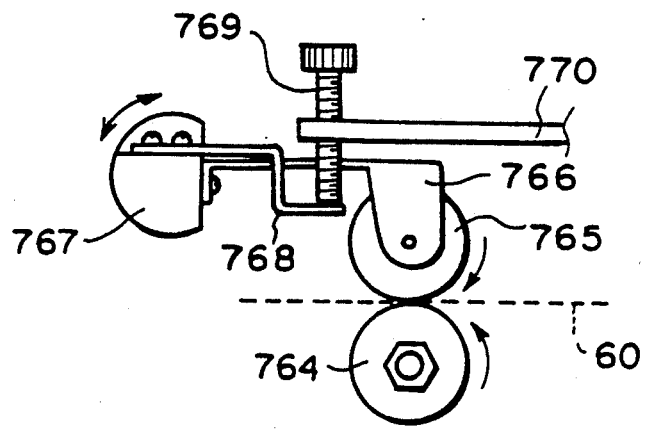
FIG. 13 is a side elevation view showing the conveyor shown in FIG. 12.

A diffusion transfer type duplicating camera shown in FIG. 12, according to this embodiment, comprising a conveyor system for horizontally carrying a sheet of photosensitive material. This conveyor system includes a group of rod-shaped rollers which extend along the transverse direction of the photosensitive material, and a plurality of guide rollers being held against each roller. Specifically, for example, evenly spaced four guide rollers are pressed against one roller, and the photosensitive material is gripped and carried by the revolving roller together with a plurality of the guide rollers. The guide roller is supported by a nip possessing spring properties, and each nip is individually mounted on a beam member. The pressure of the guide roller exerted on the roller is considered material, because variations in pressures of the guide rollers cause the photosensitive material to be transferred zigzag and improperly, thereby resulting in a crinkle occurring in the photosensitive material. If the pressure becomes weak, nominal vibrations affect the photosensitive material, there will arise distortions in a duplicate. Meanwhile, if the pressure becomes much too large, the rod-shaped roller will yield to the force.

In a conventional art, a tapped hole for mounting the nip is elongated, and the pressure of the guide rollers exerted on the roller is regulated by adjusting the mounting positions of the nips relative to the beam member. This structure provides only a narrow adjustment range of a pressure, and hence it is difficult to obtain optimum pressure. Moreover, with this structure, the pressure of each guide roller, for instance, each of the four guide rollers, must be adjusted, which requires much time.

A diffusion transfer type duplicating camera shown in FIG. 12, according to this embodiment, comprises a conveyor system 763 wherein a plurality of guide rollers 765, for example, evenly spaced four guide rollers 765 are held against a rod-shaped roller 764 which is actuated by a non-illustrated motor, and a photosensitive material 60 is transferred while it is gripped between the roller 764 and the guide rollers 765. The guide roller 765 is made up of a thin sheet of metal having a sufficient resilience, and is rotatably supported by a nip 766 possessing spring properties. This nip is mounted to a rotating shaft 767 in such a manner that the pressures of the guide rollers 765 exerted on the roller 764 can become uniform. Both ends of the rotating shaft 767 are provided with an actuating plate 768. An adjustment screw 769 is inserted into a chassis 770, and the tip end of the adjustment screw 769 is forced against the actuating plate 768. This adjustment screw 769 should preferably be provided on both sides of the rotating shaft 767 as shown in this embodiment, however, a similar result can be yielded even when the adjustment screw is provided only on one side of the rotating shaft. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

The advancement of the adjustment screw 769 causes the rotating shaft 767 to rotate clockwise, and hence the guide rollers 765 are forced against the roller 764. To this contrary, when the adjustment screw 769 is moved rearward, the rotating shaft 767 rotates counterclockwise due to the resilience of the nips 766, so that the pressures of the guide rollers 765 exerted on the roller 764 become weak. In any event, according to this embodiment, the pressures of a plurality of the guide rollers 765 can be varied simultaneously, and also there is obtained a wide range of pressure adjustments. Therefore, it is possible to readily adjust the pressure to an optimum pressure, and to produce an accurate duplicate free of distortions and a crinkle resulting from an influence of vibrations affecting the photosensitive material 60.

Thus, the duplicating camera, according to this embodiment, includes the conveyor system for horizontally transferring a sheet of photosensitive material, wherein the system is constituted of the rod-shaped roller extending along the transverse direction of the photosensitive material and a plurality of the guide rollers, each being rotatably supported by a nip possessing spring properties, and pressed against the roller. The nip is mounted on the rotating shaft which is parallel to the roller, and the ends of the rotating shaft are provided with an adjustment screw for regulating the pressures of the guide rollers exerted on the roller in response to the rotation of the rotating shaft. Thereby, it is possible to readily adjust the pressures of the guide rollers exerted on the roller to an optimum value.

SIXTH EMBODIMENT

In the diffusion transfer type duplicating camera, the exposure must be adjusted depending on the sensitivity of the photosensitive material. For example, when a block copy having voided letters is prepared by reversing the black and white of an original, a negative sheet (a reversal film) is used, wherein the negative sheet requires a much greater exposure when compared with a positive sheet (a normal film). For this reason, in a conventional art, the exposure is increased by prolonging the exposure period of the film; namely, the exposure is increased by reducing the scan speed of a scanning unit. This involves the extension of processing periods corresponding to the reduction of the scan speed. If the magnifying power of the scanning unit remains stable, it is necessary to keep the ratio of the feed rate for the photosensitive material to the scan speed of the scanning unit constant by reducing the feed rate, resulting in complicated operations.

To solve this problem, a diffusion transfer type duplicating camera shown in FIG. 1, according to this embodiment, comprises a mode selection button 813 situated on the top surface of the exposure box A. This selection button is designed so that the voltage applied to the source lamps 21 can be switched between two modes, for example, a 85 V mode and a 66 V mode. In other words, there is provided a mode selection for changing the amount of light emitted from the source lamps 21, and hence the mode can be altered in response to the sensitivity of the photosensitive material 60. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

When a normal duplicate is produced without reversing the black and white of an image of the original 50, a positive sheet is used as a non-reversal type photosensitive material 60. Since the sensitivity of this photosensitive material 60 is high, the mode selection button 813 is set to 66 V, and the duplication of the original is effected following the aforementioned procedures. When the original is duplicated by reversing the black and white of the image of the original 50, a negative sheet is used as a reversal type photosensitive material 60 where the negative sheet has a low sensitivity. Therefore, the mode selection button 813 is set to 85 V so that the amount of light emitted from the source lamps 21 can be increased. Thus, it becomes possible to ensure a necessary exposure, and to make a sharp duplication.

Thus, the diffusion transfer type duplicating camera, according to this embodiment, includes a mode selection means for changing the amount of light emitted from the source lamps. Since the amount of light emitted from the source lamps is changed instead of the exposure period when a photosensitive material having a different sensitivity is used, it is possible to prevent the extension of the processing periods, and to readily adjust the exposure by simple operations.

SEVENTH EMBODIMENT

A photosensitive material is stored in the form of a coil in a magazine is horizontally drawn from the magazine by means of a group of conveyor rollers, and is separated to a length corresponding to the length of a block copy to be produced. The photosensitive material in the form of a sheet is transferred and exposed to light in synchronization with the scanning unit. The length of the largest block copy which at least the duplicating camera can produce is ensured as a interval between a cutter and the exposure position. Since a duplicating camera having reducing and magnifying functions is designed so that a large size block copy can be produced, the interval between the cutter and the exposure position eventually becomes large. The exposure position inevitably locates around the center of the duplicating camera, and the cutter is disposed downstream of the magazine: namely, the cutter is inevitably situated in the vicinity of the center of the duplicating camera, whereby the duplicating camera has a larger width.

In a diffusion transfer type duplicating camera shown in FIG. 14, according to this embodiment, a roller 63, a cutter 62, a roller 763b, and a roller 763a are positioned in order from a magazine 61 to the downstream exposure position E, and rollers 63b and 63 are positioned on both sides of the exposure position E. These rollers are controlled independently from each other, and each roller can rotate. The rollers are inter-connected with each other by means of a guide member 864. The foremost end of the photosensitive material 60 advances along the guide member 864, and is caught by a downstream roller 63a. The guide member 864 is angularly movable, and can be displaced from the interval between the roller 763b and the roller 763a. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

Figure 14A:
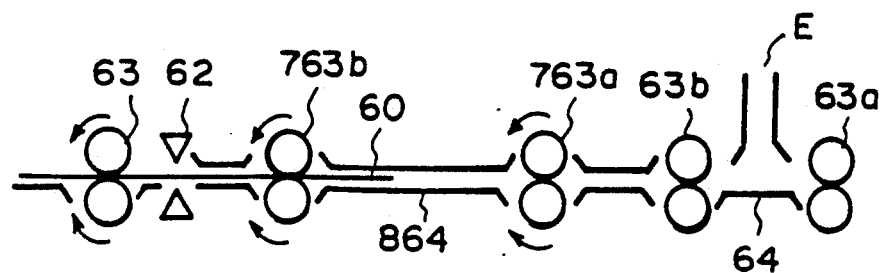
FIG. 14A, FIG. 14B, FIG. 14C, FIG. 14D is a diagrammatic representation illustrating the transfer processes of a photosensitive material.
Figure 14B:
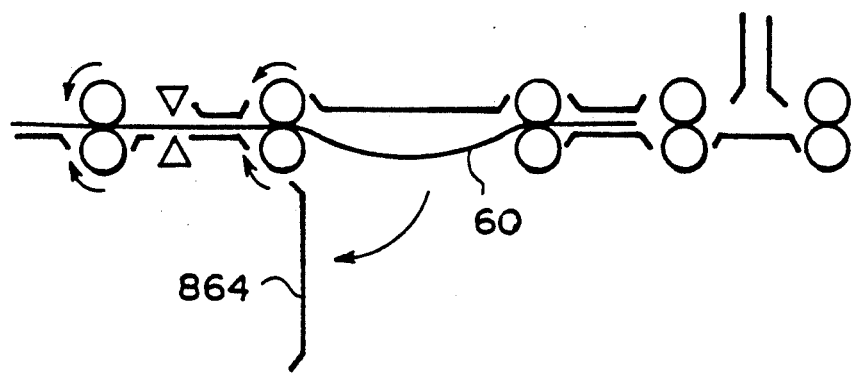
Figure 14C:
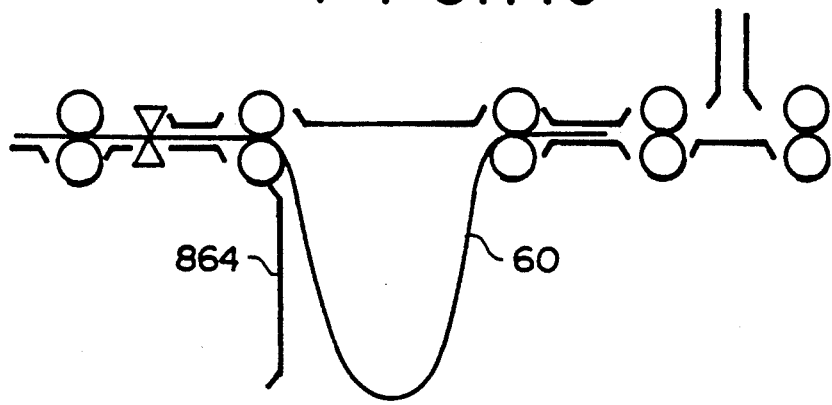
Figure 14D:
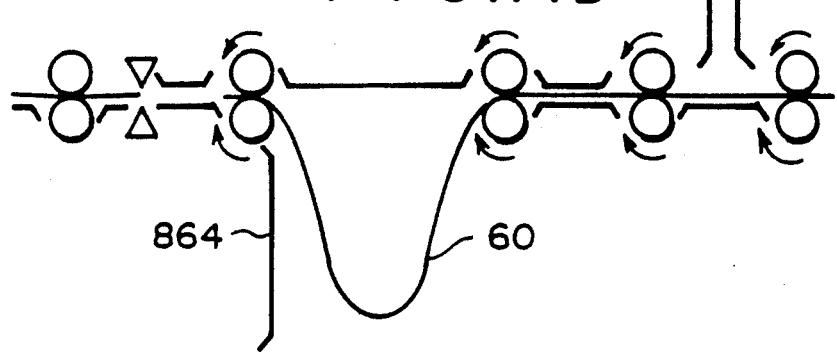

As seen from FIG. 14A, the roller 63, the roller 763b and the roller 763a are revolved, so that the photosensitive material is fed to the roller 763a. When the photosensitive material 60 is caught in the roller 763a, the roller 63a comes to rest as shown in FIG. 14B, and the guide member 864 is then angularly displaced from the interval between the roller 763b and the roller 763a. Here, since the roller 63 and the roller 763b remain rotating, substantially U-shaped sag is produced between the roller 763b and the roller 763a as shown in FIG. 14C. The distance which the photosensitive material 60 advanced is measured from the number of rotations of the rollers. When the advancement of the material reaches a predetermined value, all of the rollers are stopped, and the photosensitive material 60 is separated by the cutter 62. After the separation of the photosensitive material, all the rollers, except for the roller 63, are rotated, and the separated photosensitive material is successively exposed at the exposure position E. In other words, a sheet of the photosensitive material 60 is successively exposed to a slit of light representing the image of the original 50. The guide member 864 is not necessarily angularly displaced, and as shown in FIG. 15 the photosensitive material 60 may be slacked upwardly between the roller 763b and the roller 763a. In view of the stability, however, a downward sag has a much more stability. In any event, since a substantially U-shaped sag is produced in the photosensitive material between the rollers 763b and 763a which is next to each other, it is possible to ensure a sufficient length of the photosensitive material 60 between the cutter 62 and the exposure position E even when the interval between the rollers 763b and 763a is reduced, whereby it is possible to reduce the width of the duplicating camera corresponding to the length of the slack.

In this embodiment, a substantially U-shaped sag is produced in the photosensitive material between the two rollers, adjacent to each other, located upstream of the exposure position where the photosensitive material is exposed to the slit of light representing the image of the original, it becomes possible to reduce a interval between the cutter and the exposure position by the length of the slack. Therefore, the duplicating camera has a smaller width, and hence becomes compact.

EIGHTH EMBODIMENT

A photosensitive material is stored in the form of a coil in a magazine is horizontally drawn from the magazine by means of a group of conveyor rollers, and is separated to a length corresponding to the length of a block copy to be produced. The photosensitive material in the form of a sheet is transferred and exposed to light in synchronization with the scanning unit. The length of the largest block copy which at least the duplicating camera can produce is ensured as an interval between a cutter and the exposure position. Since a duplicating camera having reducing and magnifying functions is designed so that a large size block copy can be produced, the interval between the cutter and the exposure position eventually becomes large. The exposure position inevitably locates around the center of the duplicating camera, and the cutter is disposed downstream of the magazine: namely, the cutter is inevitably situated in the vicinity of the center of the duplicating camera, whereby the duplicating camera has a larger width. To overcome this problem, it is proposed to reduce the interval between the cutter and the exposure position by producing a substantially U-shaped sag in the photosensitive material between two rollers located between the cutter and the exposure position and being adjacent to each other.

With a substantially U-shaped sag in the photosensitive material, when the photosensitive material becomes flat from its substantially U-shaped form during the transfer of the photosensitive material to the exposure position by the rotation of the downstream roller, there occur vibrations because the photosensitive material experiences a sudden vehement tension. These vibrations are transmitted to the part of the photosensitive material already situating at the exposure position, as a result of which a latent image to be formed on the photosensitive material becomes distorted, and it becomes impossible to obtain an accurate duplicate.

In a diffusion transfer type duplicating camera shown in FIG. 16, according to this embodiment, a roller 63, a cutter 62, a roller 763b, and a roller 763a are positioned in order from a magazine 61 to the downstream exposure position E, and rollers 63b and 63a are positioned on both sides of the exposure position E. These rollers are controlled independently from each other, and each roller can rotate. The rollers are interconnected with each other by a guide member 864. The foremost end of the photosensitive material 60 advances along the guide member 864, and is caught by a downstream roller 63a. There is provided a displacing means for displacing the guide member 864 from the interval between the rollers 763b and 763a adjacent to each other. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

As seen from FIG. 14A, the roller 63, the roller 763b and the roller 763a are revolved, so that the photosensitive material 60 is fed to the roller 763a. When the photosensitive material 60 is caught in the roller 763a, the roller 763a comes to rest as shown in FIG. 14B, and the guide member 864 is then angularly displaced from the interval between the roller 763b and the roller 763a. Here, since the roller 63 and the roller 763b remain rotating, a substantially U-shaped sag is produced between the roller 763b and the roller 763a as shown in FIG. 14C. The distance which the photosensitive material 60 advanced is measured by a non-illustrated sensor. When the advancement of the photosensitive material 60 reaches a predetermined value, all of the rollers are stopped, and the photosensitive material 60 is separated by the cutter 62. After the separation of the photosensitive material, all the rollers, except for the roller 763b, are rotated. As a result of this, as seen from FIG. 16, the end of the photosensitive material 60 is detached from the roller 763b, and hangs down. The separated photosensitive material is successively exposed at the exposure position E by rotating the rollers 763a, 63b and 63a. In other words, a sheet of the photosensitive material 60 is sequentially exposed to a slit of light representing the image of the original 50. Since a substantially U-shaped sag is produced in the photosensitive material between the rollers 763b and 763a which is next to each other, it is possible to ensure a sufficient length of the photosensitive material 60 between the cutter 62 and the exposure position E even when the interval between the rollers 763b and 763a is reduced, whereby it is possible to reduce the width of the duplicating camera corresponding to the length of the slack. Moreover, since the photosensitive material 60 once hangs down, and is transferred to the exposure position E, the photosensitive material 60 experiences no vibrations during its transfer. Thus, an accurate latent image of the original 50 is produced on the photosensitive material, and hence it is possible to produce a sharp duplicate free of distortions.

As mentioned above, in this embodiment, a substantially U-shaped sag is produced in the photosensitive material between two rollers being adjacent to each other and located upstream of the exposure position where the photosensitive material is exposed to a slit of light representing the image of the original, and then the photosensitive material is separated to a predetermined length. Since the photosensitive material thus separated once hangs down, and is transferred to the exposure position, it is possible to reduce the interval between the cutter and the exposure position, and hence it is possible to gently transfer the photosensitive material. Accordingly, the duplicating camera has a smaller width, and it becomes possible to produce an accurate duplicate free of distortions.

NINTH EMBODIMENT

In order to make an accurate duplicate, the feed rate V0 of the photosensitive material is material, and it is necessary to feed the photosensitive material at a constant speed without variations. Among a plurality of conveyor rollers, a first roller 63a located downstream of the exposure position is a feed rate regulation roller, and this roller is precisely driven by a motor different from other motors for driving other rollers. More specifically, the group of the rollers are driven by a motor designated for the feed rate regulation roller 63a and another motor designated for other rollers, that is, 963 and 63b, and the latter rollers are rotated at the same circumferential speed. The circumferential speed of the roller 63a is increased by about 5–10% as compared with that of the other rollers, and the photosensitive material 60 is exposed to light while it is stretched by the feed rate regulation toller 63a. When the tip end of the photosensitive material 60 is caught in the roller 963 located downstream of the roller 63a, a swell grows in the photosensitive material 60 between the roller 63a and the downstream roller 963, because the roller 63a is faster than the downstream roller 963 in circumferential speed. A guide member disposed between the roller 963 and the roller 63b is composed of an upper plate and a lower plate, and the photosensitive material 60 passes through a small clearance between these plates. For this reason, the clearance of the guide member is likely to be clogged with the relaxed photosensitive material 60.

Figure 17:
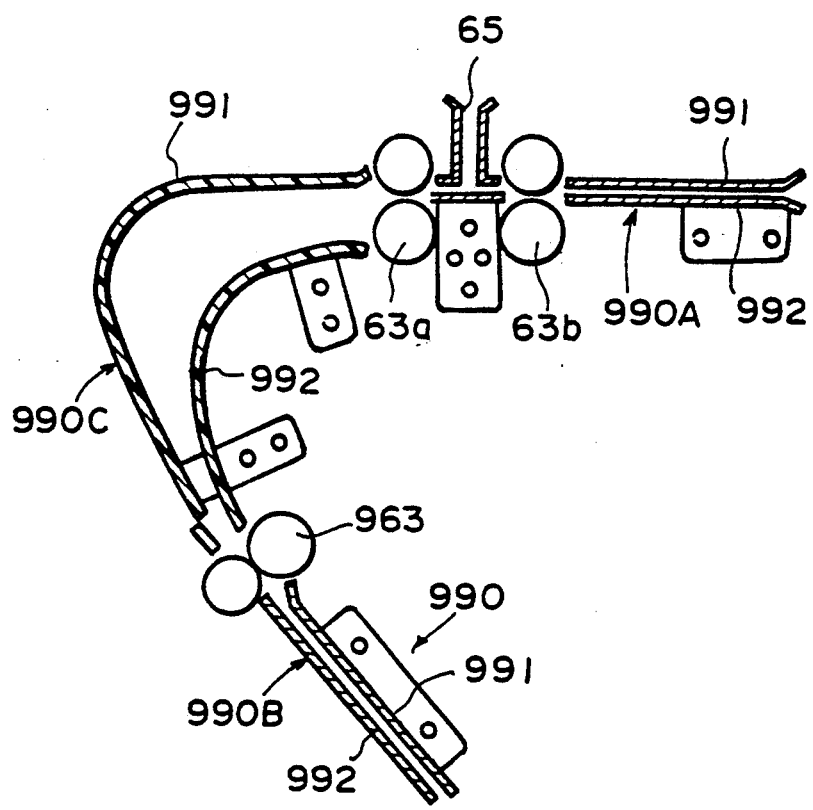
FIG. 17 is an enlarged view showing a guide member according to one embodiment of this invention.

In a diffusion transfer type duplicating camera shown in FIG. 17, according to this embodiment, a guide member 990 is composed of an upper plate 991 and a lower plate 992, and the photosensitive material passes through a clearance therebetween. This guide member is divided into three subsections, that is, a horizontally extending portion 990A, a tilted portion 990B and a bulging portion 990C. The horizontally extending portion 990A serves to horizontally guide the photosensitive material to be exposed, and the photosensitive material is exposed just below a slit plate 65. A roller positioned downstream of the slit plate 65 is a feed rate regulation roller 63a, and this roller rotates at a circumferential speed faster than the other roller 963 positioned downstream of the slit plate 65. The tilted portion 990B serves to lead the photosensitive material to an image receiving material locating downward from the tilted portion, and the roller 963 is positioned above the tilted portion. The bulging portion 990C acts to interconnect the horizontally extending portion 990A with the tilted portion 990B, and has a wider clearance between the upper plate 991 and the lower plate 992. This bulging portion 990C is not provided with rollers. Here, the rest of the duplicating camera according to this embodiment is the same as the duplicating camera according to the first embodiment. Therefore, the same reference numerals are provided to the corresponding features of the first embodiment, and the explanation thereof are omitted here for clarity.

With the above structure, when a non-illustrated duplicated switch is turned on while an original is situated on an original exposure table 11, the photosensitive material guided by the horizontally extending portion 990A is exposed to light just below the slit plate 65, and is superimposed on the image receiving material after it is guided along the bulging portion 990C and the tilted portion 990B. Since the circumferential speed of the feed rate regulation roller 63a is faster than the other rollers 63b and 963, the photosensitive material is tensionally transferred by means of the feed rate regulation roller 63a. When the tip end of the photosensitive material is caught in the roller 963 above the tilted portion 990B, the part of the photosensitive material gripped by the roller 963 is transferred at a slower circumferential speed. Namely, the rear of the photosensitive material is forced at a faster speed, whilst, the front of the same is transferred at a slower speed, so that a swell in the form of a wave grows in the bulging portion 990C. In this instance, the guide member 990 is not clogged with a swell in the photosensitive material because of a larger clearance between the upper plate 991 and the lower plate 992, thereby ensuring a smooth transfer of the photosensitive material.

In this embodiment, a larger clearance is formed between the upper and lower plates of the bulging portion interconnecting the horizontally extending portion with tilted portion of the guide member. This larger clearance permits the swell of the photosensitive material, and hence it becomes possible to prevent the guide member from becoming clogged with the photosensitive material utilizing a simple structure, whereby it can be attained a smooth transfer of the photosensitive material.

It will be understood that the above description of the present invention is susceptible to various modifications, changes, and adaptations and that the same are intended to be comprehended within the meaning and range of equivalents of the appended claims.

What is claimed is:

1. A diffusion transfer type duplicating camera including an exposure box, which incorporates a scanning unit causing a slit of light to be swept laterally over an original situated on an original exposure table, and a transfer box, in which a sheet of photosensitive material which is conveyed parallel with respect to the original exposure table at an exposure stage is exposed to light representing a slit image from the exposure box, and the exposed photosensitive material is superimposed on an image receiving material, and the image recorded on the photosensitive material is transferred to the image receiving material, wherein the duplicating camera is characterized in that the exposure box is rotatably disposed on the transfer box, and the exposure box and the transfer box are fixed to each other after the scan axis of the scanning unit is matched with the transfer axis of the photosensitive material.

2. A diffusion transfer type duplicating camera including an exposure box, which incorporates a scanning unit causing a slit of light to be swept laterally over an original situated on an original exposure table, and a transfer box, in which a sheet of photosensitive material which is conveyed parallel with respect to the original exposure table at an exposure stage is exposed to light representing a slit image from the exposure box, and the exposed photosensitive material is superimposed on an image receiving material, and the image recorded on the photosensitive material is transferred to the image receiving material, wherein the duplicating camera is characterized in that the exposure stage is composed of an exposure table over the upper surface of which the photosensitive material is slidably transferred and conveyor rollers conveyor rollers disposed upstream and downstream of the exposure table, the upper surface of the exposure table being situated above the level of the photosensitive material conveyed by the conveyors.

3. A duplicating camera as defined in claim 2, the exposure table further comprises a slit plate situated in close proximity to the exposure table, and a light shield member including two parallel plates erected on the slit plate, wherein the both ends of the slit extend to the vicinity of the conveyance rollers.

4. A diffusion transfer type duplicating camera including an exposure box, which incorporates a scanning unit causing a slit of light to be swept laterally over an original situated on an original exposure table, and a transfer box, in which a sheet of photosensitive material which is conveyed parallel with respect to the original exposure table at an exposure stage is exposed to light representing a slit image from the exposure box, and the exposed photosensitive material is superimposed on an image receiving material, and the image recorded on the photosensitive material is transferred to the image receiving material, wherein the duplicating camera is characterized in that the exposure box is rotatably disposed on the transfer box, and the exposure box and the transfer box are fixed to each other after the scan axis of the scanning unit is matched with the transfer axis of the photosensitive material; and the exposure stage is composed of an exposure table over the upper surface of which the photosensitive material is slidably transferred, conveyor rollers disposed upstream and downstream of the exposure table, a slit plate situated in close proximity to the exposure table, and a light shield member including two parallel plates erected on the slit plate, wherein the both ends of the slit extend to the vicinity of the conveyance rollers.

5. A duplicating camera as defined in claim 3, wherein the scanning unit includes a plane mirror holding structure in which a rectangular plane mirror, both ends of which are pressed against receiving protuberances, is mounted by a spring which is held by a metal pressure fitting, and the spring is constituted of a bow-shaped pressing portion and an inverted U-shaped holding portion, and the top surface of the metal pressure fitting is provided with notches, whereby the holding potion of the spring is inserted into the notches while being compressed so that the pressing portion of the spring can press against the plane mirror.

6. A duplicating camera as defined in claim 3, wherein the stand-by position of the scanning unit is situated below the location adjacent to the end of the original exposure table, so that the stand-by position is spaced away from the original exposure table.

7. A duplicating camera as defined in claim 6, wherein a metal heat sink is disposed at the stand-by position of the upper surface.

8. A duplicating camera as defined in claim 3, further comprising a photo sensor for detecting whether or not a magazine incorporating the photosensitive material is loaded wherein the sensor is arranged so that the duplicating camera can operate only when the optical sensor detects that the magazine is loaded in the duplicating camera.

9. A duplicating camera as defined in claim 3, further comprising a conveyor system for carrying the photosensitive material, and wherein the conveyor system is constituted of a group of rod-shaped rollers extending along the transverse direction of the photosensitive material, and a plurality of guide rollers, each being rotatably supported by a nip possessing spring characteristics so that the guide roller can be held against the roller, the nips being mounted on a rotating shaft parallel to the roller, and wherein at least one end of the rotating shaft is provided with an actuation plate together with an adjustment screw for regulating the pressures of the guide rollers exerted on the roller in response to the rotation of the shaft.

10. A duplicating camera as defined in claim 3, further comprising a selection mode for changing the amount of light emitted from the source lamp depending on whether the photosensitive material to be used is a positive or a negative sheet.

11. A duplicating camera as defined in claim 3, further comprising a group of conveyor rollers for carrying the photosensitive material wherein there is provided a controller means for individually controlling two of the conveyor rollers which are adjacent to each other and located upstream of the exposure position, and the controller means is arranged in such a manner that only the upper rollers are revolved when the photosensitive material is caught in the two conveyor rollers so that a substantially U-shaped sag can be created in the photosensitive material between the two rollers, and the photosensitive material can then be cut to a desired length.

12. A duplicating camera as defined in claim 3, wherein the group of conveyor rollers include a controller means for individually controlling two of the rollers which are adjacent to each other and located upstream of the exposure location, and displacing means for displacing a guide member between the two rollers, and wherein when the photosensitive material is caught in the two rollers, the guide member between the rollers is displaced, and only the upper rollers are revolved so that a substantially U-shaped sag can be created between the two rollers and wherein the photosensitive material is then cut at a desired length after the upper rollers are stopped, and wherein only the upper roller of the two is rotated so that the photosensitive material thus separated can hang down from the other roller of the two.

13. A duplicating camera as defined in claim 3, further comprising a guide member, defined by the upper and lower plates, for directing the exposed photosensitive material, wherein the guide member is composed of a horizontally extending horizontally extending portion for directing the photosensitive material to the exposure stage, a tilted portion obliquely extending downwards for leading the exposed photosensitive material so that the material can be superimposed on the image receiving material, and a bulging portion having a wider clearance between the upper and lower plates thereof for the swell of the photosensitive material.

* * * * *